(12) United States Patent
Wong et al.

(10) Patent No.: US 7,177,604 B2
(45) Date of Patent: Feb. 13, 2007

(54) POINTING DEVICE FOR HANDHELD DEVICES AND METHOD FOR IMPLEMENTING SAME

(75) Inventors: John Patrick Wong, Vancouver (CA); Jeff Philip Crampton, Vancouver (CA)

(73) Assignee: Nokia Corporation, Espoo (FI)

( * ) Notice: Subject to any disclaimer, the term of this patent is extended or adjusted under 35 U.S.C. 154(b) by 568 days.

(21) Appl. No.: 10/335,253

(22) Filed: Dec. 31, 2002

(65) Prior Publication Data

US 2004/0127268 A1 Jul. 1, 2004

(51) Int. Cl.
*H04B 1/38* (2006.01)

(52) U.S. Cl. ............... 455/90.3; 455/556.2; 455/90.2; 455/575.1

(58) Field of Classification Search ............ 455/575.1, 455/575.6, 90.1, 96.3, 550.1, 566, 556.2, 455/90.3, 559, 90.2, 556.1; 345/156, 169, 345/157, 161, 179; 361/683, 686

See application file for complete search history.

(56) References Cited

U.S. PATENT DOCUMENTS

| | | | |
|---|---|---|---|
| 6,208,328 B1 * | 3/2001 | Kawachiya et al. | 345/157 |
| 6,515,687 B1 * | 2/2003 | Wynn et al. | 345/157 |
| 6,563,487 B2 * | 5/2003 | Martin et al. | 345/156 |
| 6,731,267 B1 * | 5/2004 | Tuoriniemi et al. | 345/156 |
| 6,806,865 B2 * | 10/2004 | Oueslati et al. | 345/161 |
| 2003/0125094 A1 * | 7/2003 | Hyun et al. | 455/566 |
| 2005/0001786 A1 * | 1/2005 | Jensen | 345/6 |
| 2005/0073496 A1 * | 4/2005 | Moore et al. | 345/156 |

* cited by examiner

*Primary Examiner*—Edward F. Urban
*Assistant Examiner*—John J. Lee
(74) *Attorney, Agent, or Firm*—Alston & Bird LLP

(57) ABSTRACT

A handheld device having processor components operatively connected together for performing predetermined functions. The device defines a socket configured for rotatably receiving a ball defining an orifice configured for receiving a stylus. The socket is further configured for generating to the processor components electrical signals indicative of movement of the ball in response to movement of the stylus. The processor components include pointing device logic for responding to said signals.

22 Claims, 4 Drawing Sheets

POINTING DEVICE FOR HANDHELD DEVICES AND METHOD FOR IMPLEMENTING SAME

TECHNICAL FIELD

The invention relates generally to user interfaces and, more particularly, to pointing devices configured for facilitating movement of objects on a display and/or interacting with electronic games.

BACKGROUND

Users of handheld devices, such as cellular mobile telephones, communicators, multimedia phones, personal digital assistants (PDAs), handheld gaming devices, and the like, and combinations thereof, collectively referred to herein as "handheld devices," desire that such devices provide telecommunication services, as well as gaming, entertainment, and other features that require sophisticated graphical user interfaces (GUI's). A need has therefore arisen to develop and provide sophisticated user interfaces (UI's) that provide enhanced gaming and entertainment capabilities, which are also intuitive to use.

One common UI used in gaming and other applications is a rocker. Rockers tend to be very compact and are therefore adaptable for use with handheld devices, such as cell phones. A rocker may be depressed at any one of a number of points, such as four, five, eight, or nine points, located on the rocker. For example, a rocker with four such points, may be depressed at a selected point to indicate orthogonal directions such as up, down, left, or right. However, many applications, such as games, require much more agility in motion and pointing capability than is permitted with even as many as nine different points that may be indicated by a rocker.

An improvement in the agility and pointing capability of a rocker is found in a pointing device, such as a "joystick," which may be moved in any of a virtually infinite number of different spatial directions to control the movement of an object, such as a cursor, on a screen, such as a GUI. For this reason, joysticks are often a UI of choice for many gamers. However, due to the nature of joysticks, namely, that they inherently consume a substantial amount of space, they have not been considered practical for use with handheld devices, such as cell phones.

Accordingly, a continuing search has been directed to the development of apparatuses and methods by which a user may obtain the advantages of compactness provided by rockers, as well as the advantages of greater agility and pointing capabilities provided by pointing devices, such as joysticks.

SUMMARY

The present invention, accordingly, provides for a handheld device having processor components operatively connected together for performing predetermined functions. The device defines a socket configured for rotatably receiving a ball defining an orifice configured for receiving a stylus. The socket is further configured for generating to the processor components electrical signals indicative of movement of the ball in response to movement of the stylus. The processor components include pointing device logic for responding to said signals.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning handheld devices (e.g., cell phones), printed wire boards, circuitry for implementing logic required for pointing devices (e.g., joysticks), and the like have been omitted inasmuch as such details are not considered necessary to obtain a complete understanding of the present invention, and are considered to be within the skills of persons of ordinary skill in the relevant art.

Figure 1:
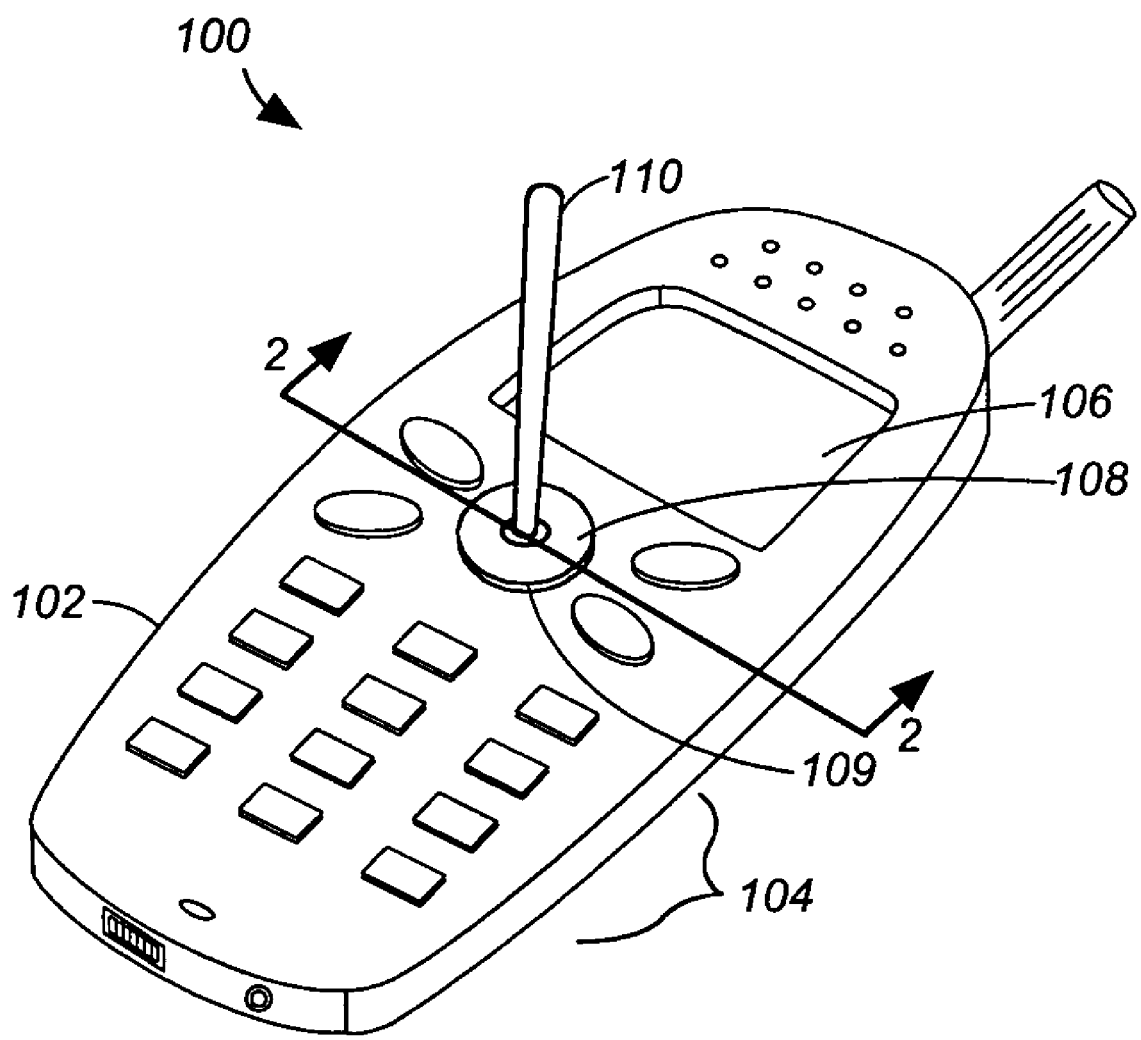
FIG. 1 is a plan view of a cell phone embodying features of the present invention.

Referring to FIG. 1 of the drawings, the reference numeral 100 generally designates a handheld device, such as a cellular mobile telephone, a communicator, a multimedia phone, a personal digital assistant (PDA), a gaming device, or the like, or a combination thereof, embodying features of the present invention. The handheld device 100 is exemplified in FIG. 1 as a cell phone, and includes a main body 102 having a number of conventional features, such as a key pad 104, a graphical user interface (GUI) or display 106, logic (not shown, for performing functions required, for example, by telecommunication and games), and the like. Handheld devices and the various aforementioned features are, for the most part, considered to be well-known in the art and will, therefore, not be discussed in further detail herein.

In addition to the foregoing, the handheld device 100 includes a ball 108 rotatably mounted within a socket 109 defined within the body 102. As described in further detail below, the ball 108 defines an orifice configured for receiving an end, preferably pointed, of a stylus 110. The ball 108 and socket 109 are preferably integrated with the body 102 using substantially conventional technology such as is associated with conventional joy sticks. It is understood that such conventional technology includes means (e.g., a spring return feature, not shown) for urging the ball 108 to a neutral position in which a stylus 110 received therein would be oriented substantially perpendicular to the face of the cell phone 100 when not being moved otherwise by a user. It is still further understood that such conventional technology also includes well-known means for detecting rotation of the ball 108 within the socket 109, and for generating to a processor (not shown) a signal indicative of such rotation. The processor includes conventional logic for controlling the movement of an object (e.g., cursor) on the display 106 based on the received signal indicative of rotation of the ball 108. The logic preferably emulates the logic of a relative pointing device, moving an object on the display 106 when the stylus 110 is moved, and stopping the movement when the stylus 110 is released. Alternatively, the logic may emulate the logic of an absolute pointing device, with each position of the stylus 110 mapped to a specific location on the display 106.

Figure 2:
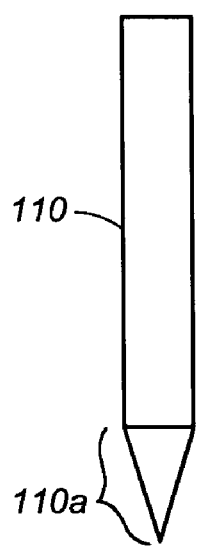
FIG. 2 is an elevation view of a stylus of used in conjunction with the cell phone of FIG. 1.

FIG. 2 exemplifies a single piece stylus 110 with a tip 110a configured for insertion into the ball 108. In alternate embodiments, the tip 110a may assume any of a number of shapes effective for insertion into the ball 108, such as a blunt end or a stepped cylindrical end.

Figure 3:
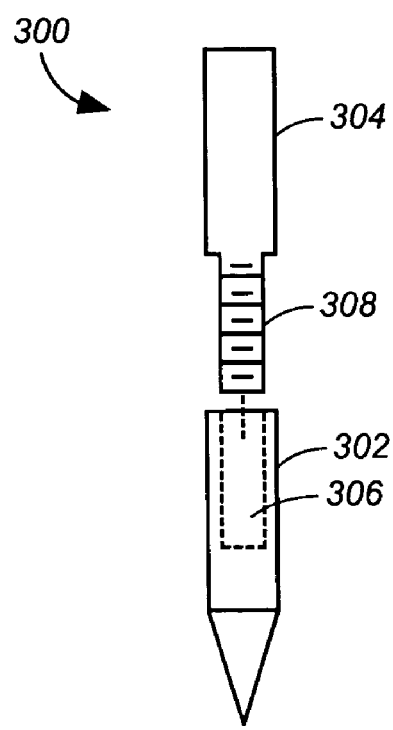
FIGS. 3 and 4 are alternate embodiments of the stylus of FIG. 2.
Figure 4:
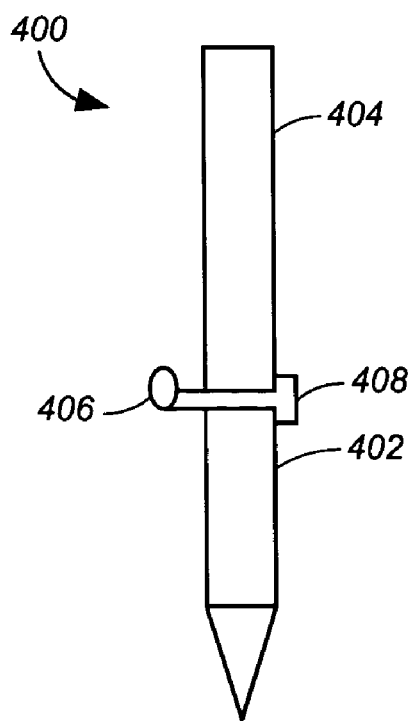

FIGS. 3 and 4 show alternate embodiments of the stylus 110. In FIG. 3, a stylus 300 is similar to the stylus 110, but is separable into a tip portion 302 with a tip end 302a, and an extension portion 304 to permit compact storage of the stylus 300 and/or use of the tip portion alone if desired. The tip portion 302 includes a threaded bore 306, and the extension portion 304 includes a threaded portion 308 configured for matingly engaging the threaded bore 306 to thereby form a stylus similar to the stylus 110. The tip portion 302 may be used in conjunction with the ball 108 without the extension portion 304. Alternatively, the bore 306 and portion 308 may be configured mating engagement without threads. In FIG. 4, a stylus 400 is similar to the stylus 110, but comprises a tip portion 402 with a tip end 402a, and an extension portion 404 connected together via a hinge 406 and clasp 408 to permit compact storage of the stylus 400 and/or, if desired, use of the tip portion without extending the extension portion.

Figure 5:
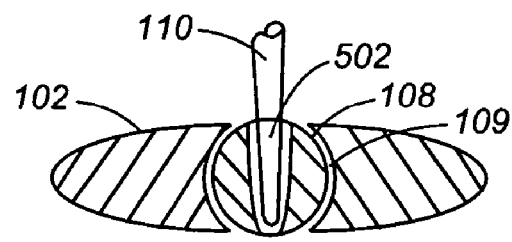
FIG. 5 is a cross-sectional view of the cell phone of FIG. 1 taken along the line 2—2 of FIG. 1.

FIG. 5 depicts a cross-sectional view of the ball 108 and socket 109. As shown therein, the ball 108 defines an orifice 502 configured for receiving the tip 110a of the stylus 110. The orifice 502 extends through the ball 108 to permit maximum insertion of the tip end 110a into the orifice, to thereby obtain the maximum leverage possible by a user when using the stylus 110.

Figure 6:
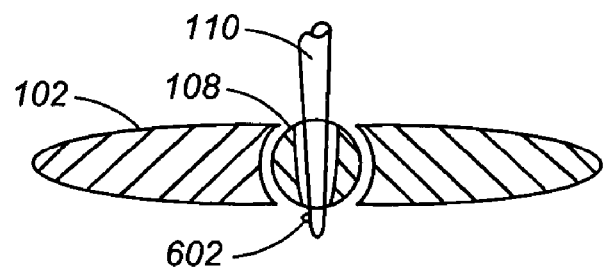
FIGS. 6 and 7 are cross-sectional views of the cell phone of FIG. 1 and alternate embodiments of the stylus, taken along the line 2—2 of FIG. 1.

FIG. 6 depicts an alternate embodiment of a ball 108 and socket 109 similar to that depicted in FIG. 5, but with a stylus 110 having a detent 602 on the end of the tip 110a. The detent 602 is configured so that when the tip 110a is extended beyond the orifice, it snaps out to assure a user that the stylus 110 is secured in place.

Figure 7:
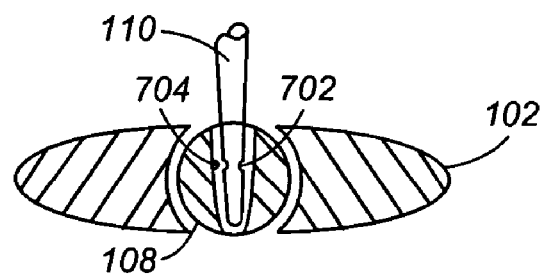

FIG. 7 depicts an alternate embodiment of a ball 108 and socket 109 similar to that depicted in FIG. 6, but with a stylus 110 having a detent 602 positioned on the end of the tip 110a to matingly engage the interior of the orifice 502, to thereby assure a user that the stylus 110 is secured in place.

Figure 8:
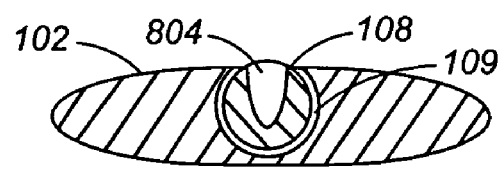
FIG. 8 is a cross-sectional view of the cell phone of FIG. 1 and alternate embodiments of a ball and socket, taken along the line 2—2 of FIG. 1.

FIG. 8 depicts an alternate embodiment of a ball 108 and socket 109 similar to that depicted in FIG. 5, but with the socket 109 extending across the bottom side (as viewed in FIG. 8) of the ball 108, and the orifice 804 extending only partially through the ball 108, to thereby preclude the need for an opening on both sides of the cell phone 100.

Figure 9:
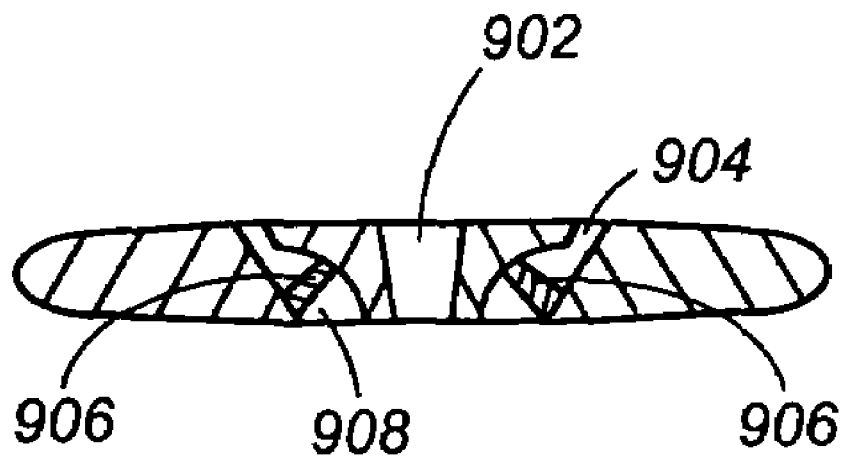
FIGS. 9 and 10 are cross-sectional views of the cell phone of FIG. 1 and alternate embodiments of a socket, taken along the line 2—2 of FIG. 1.

FIG. 9 depicts an alternate embodiment of a socket 909 positioned within a cavity 908 of the cell phone 100, and which socket is operative without a ball. The socket 909 includes an orifice 902 which extends through the socket 909 for receiving the tip end 110a of the stylus 110. The socket 909 is movably secured to the cell phone 100 via an elastomeric skirt 906 which permits movement of the socket 909 within the cavity 908. The skirt 906 is preferably fabricated from a suitable elastomeric material, such as, by way of example and not limitation, silicon, santaprene, rubber, plastic foam, flexible plastic, and the like, effective for resiliently restoring the socket 909 substantially to an neutral position subsequent to the socket 909 being moved by a user via a stylus.

Figure 10:
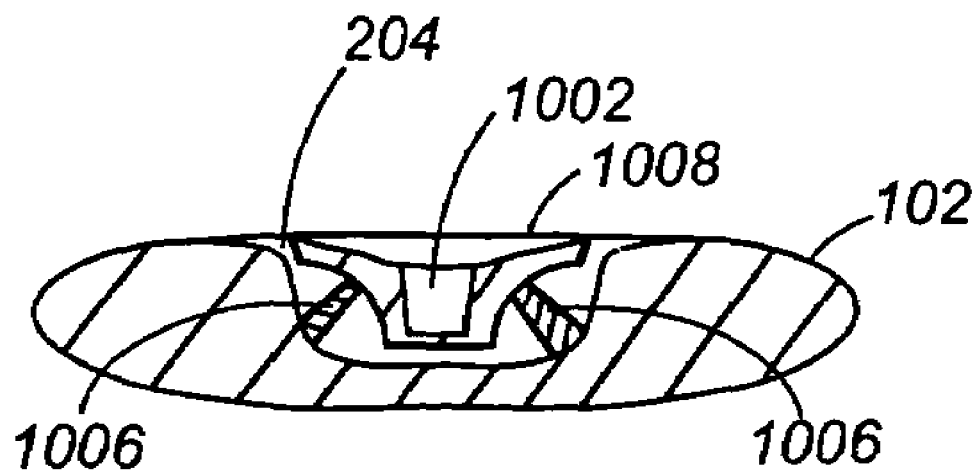

FIG. 10 depicts an alternate embodiment of a socket 1009 similar to the socket depicted in FIG. 9. Unlike the socket 909, though, the socket 1009 defines an orifice 1002 which does not extend through the socket 1009, to thereby preclude the need for an opening on both sides of the cell phone 100

In operation, a user (not shown) places a tip end 110a, 302a, or 402a of a respective stylus 110, 300 or 400, into an orifice 502, 804, 902, or 1002. If a stylus is used having a detent 602 or 702, then a user will also receive tactile feedback indicating that the stylus is secured in position and ready for use. Upon movement of the stylus by the user, the motion is detected and a signal generated in a conventional manner indicating to a processor (not shown) housed by the cell phone 100 what motion the user is imparting to the stylus. The processor then causes an object on the display 106 to move according to the motion imparted to the stylus. As discussed above, the motion preferably emulates a relative pointing device, but alternatively may emulate an absolute point device.

By the use of the present invention, a user may obtain the advantages of compactness provided by rockers, as well as the advantages of greater agility and pointing capabilities provided by pointing devices, such as joysticks. The present invention also renders moot the need for function keys or a rocker for gaming or navigating.

It is understood that the present invention may take many forms and embodiments. Accordingly, several variations may be made in the foregoing without departing from the spirit or the scope of the invention. For example, the ball 108 and socket 109 may be configured for additional or alternative use as a trackball, a gaming rocker, or a combination thereof, in addition to use as a pointing device. In another variation, control buttons may be positioned adjacent the ball and/or socket to more strongly emulate a conventional joystick. Still further, the stylus may comprise any pointed instrument, such as a conventional pen or pencil, and the orifice 502, 804, 902, or 1002 may be sized accordingly for receiving same.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A handheld device comprising:
   a main body having processor components operatively connected together for performing predetermined functions;
   a stylus;
   a ball defining an orifice configured for receiving said stylus; and
   a socket defined by said main body for rotatably receiving said ball, socket being configured for generating to said main body electrical signals indicative of movement of said ball in response to movement of said stylus, said processor components including pointing device logic for responding to said signals.

2. The handheld device of claim 1, wherein said handheld device is a selected one of a cellular mobile telephone, a communicator, a multimedia phone, a personal digital assistant (PDA), and a gaming device.

3. The handheld device of claim 1, wherein said orifice extends fully through said ball.

4. The handheld device of claim 1, wherein said orifice extends only partially through said ball.

5. The handheld device of claim 1, wherein said stylus comprises detents configured for engaging said ball and securing said stylus in said ball.

6. The handheld device of claim 1, wherein said stylus comprises a tip portion and at least one extension portion secured together.

7. The handheld device of claim 1, wherein said pointing device logic is adapted for emulating one of a relative pointing device and an absolute pointing device.

8. The handheld device of claim 1, wherein said predetermined functions include at least one of telecommunications functions, gaming functions, and entertainment functions.

9. The handheld device of claim 1, wherein said ball is configured to additionally or alternatively be used as a trackball.

10. A handheld device comprising:
   a main body having processor components operatively connected together for performing predetermined functions;
   a stylus;
   a socket defining an orifice configured for receiving said stylus; and
   an elastomeric skirt movably securing said socket within a cavity of said main body, said skirt being configured for generating to said main body electrical signals indicative of movement of said socket in response to tilting movement of said stylus, said processor components including pointing device logic for responding to said signals.

11. The handheld device of claim 10, wherein said handheld device is a selected one of a cellular mobile telephone, a communicator, a multimedia phone, a personal digital assistant (PDA), and a gaming device.

12. The handheld device of claim 10, wherein said orifice extends fully through said socket.

13. The handheld device of claim 10, wherein said orifice extends only partially through said socket.

14. The handheld device of claim 10, wherein said stylus comprises detents configured for engaging said socket and securing said stylus in said socket.

15. The handheld device of claim 10, wherein said stylus comprises a tip portion and at least one extension portion secured together.

16. The handheld device of claim 10, wherein said pointing device logic is adapted for emulating one of a relative pointing device and an absolute pointing device.

17. The handheld device of claim 10, wherein said predetermined functions include at least one of telecommunications functions, gaming functions, and entertainment functions.

18. A method for integrating a pointing device into a handheld device, the method comprising the steps of:
   rotatably mounting a ball within a socket defined by said handheld device, said ball defining an orifice for receiving a stylus, said socket being configured for generating to a processor of said handheld device electrical signals indicative of movement of said ball in response to movement of said stylus; and
   imparting pointing device logic to said processor for responding to said signals.

19. The method of claim 18, wherein said handheld device is a selected one of a cellular mobile telephone, a communicator, a multimedia phone, a personal digital assistant (PDA), and a gaming device.

20. The method of claim 18, wherein said orifice extends fully through said ball.

21. The method of claim 18, wherein said stylus comprises detents configured for engaging said ball and securing said stylus in said ball.

22. The method of claim 18, wherein said ball is configured to additionally or alternatively be used as a trackball.

* * * * *